US008065690B2

(12) United States Patent
Gokhale et al.

(10) Patent No.: US 8,065,690 B2
(45) Date of Patent: Nov. 22, 2011

(54) METHOD AND SYSTEM FOR EVENT-BASED REMOTE PROCEDURE CALL IMPLEMENTATION IN A DISTRIBUTED COMPUTING SYSTEM

(75) Inventors: Makarand Gokhale, Sunnyvale, CA (US); David Zink, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1348 days.

(21) Appl. No.: 11/293,074

(22) Filed: Dec. 1, 2005

(65) Prior Publication Data
US 2007/0130574 A1  Jun. 7, 2007

(51) Int. Cl.
*G06F 9/52* (2006.01)
(52) U.S. Cl. ........ 719/330; 719/318; 718/102; 718/107; 718/108
(58) Field of Classification Search .................... 719/318
See application file for complete search history.

(56) References Cited

U.S. PATENT DOCUMENTS

| 6,081,906 | A  | * | 6/2000 | Nishizawa et al. | 714/2 |
|---|---|---|---|---|---|
| 6,226,689 | B1 | * | 5/2001 | Shah et al. | 719/314 |
| 6,321,274 | B1 | * | 11/2001 | Shakib et al. | 719/330 |
| 6,446,137 | B1 | * | 9/2002 | Vasudevan et al. | 719/330 |
| 6,868,543 | B1 | * | 3/2005 | Nusbickel | 719/318 |
| 6,901,596 | B1 | * | 5/2005 | Galloway | 719/330 |
| 2005/0125802 | A1 | * | 6/2005 | Wang et al. | 718/108 |
| 2005/0138629 | A1 | * | 6/2005 | Samra | 718/107 |
| 2007/0250840 | A1 | * | 10/2007 | Coker et al. | 719/320 |

OTHER PUBLICATIONS

Birman, Kenneth P., "Building Secure and Reliable Network Applications," Manning Publications Co., 1996, pp. iii-iv, v-xiii, 56-81, and 581-591.

\* cited by examiner

*Primary Examiner* — Andy Ho
*Assistant Examiner* — Syed Roni

(57) ABSTRACT

A system and method for managing a remote procedure call (RPC) system in a distributed system is disclosed. The distributed computing system is typically implemented as a client server model. A server implements several procedures and offers these procedures as services to clients in the distributed computing system. A server handles multiple RPC requests from multiple clients. A client sends an RPC request to a server; the server processes the requested procedure, and sends a reply back to the client.

41 Claims, 10 Drawing Sheets

METHOD AND SYSTEM FOR EVENT-BASED REMOTE PROCEDURE CALL IMPLEMENTATION IN A DISTRIBUTED COMPUTING SYSTEM

BACKGROUND

The present invention relates generally to remote procedure calls in a distributed computing system. More specifically, the present invention relates to a method and a system for managing remote procedure calls in a distributed computing system, based on an event-driven mechanism.

Computer applications include one or more program units, such as a function or a procedure, hereinafter referred to as procedures. Each procedure includes a block of programming codes that implement an operation or functionality on a set of values, hereinafter referred to as parameters.

A procedure may be located on the same node as the application program. Alternatively, the procedure may be located on a remote node. A procedure-based model of application processing enables the execution of a computer application on disparate computational devices. The remote procedure call system, therefore, enables the application program being executed on one computer, hereinafter referred to as client-computational node, to execute a desired procedure located on a remote computational node, hereinafter referred to as server-computational node.

In a distributed computing system, server-computational nodes publish a list of services they can offer to client-computational nodes. In a distributed computing system, multiple client interactions are active on a server-computational node. The server-computational nodes in the prior art implement the remote procedure call system by using a multi-threaded environment, spawning a separate thread of execution for each client request.

In the remote procedure call systems known in the prior art, the multiple threads of execution share the processing time of the processor, based on an algorithm. However, as the number of threads being simultaneously processed on a server-computational node increases, thread swapping becomes inefficient. For example, a thread may be blocked, waiting for an action from a thread that is progressing very slowly due to a large number of threads being supported under time slicing. In addition to the above, each thread requires its own stack for processing, which increases memory overheads at the server-computational node.

The two most important overheads associated with switching of thread are context switching and storage management.

Context switching includes storing the present state of a running thread and retrieving the old state of a sleeping thread. The actual information stored and retrieved may include a range of chip registers including, for example, general registers, segment registers, and so forth. Therefore, context switching involves changing a large amount data, which makes it a very expensive operation in an operating system.

Another challenge being faced by the programmers is to maintain the performance of massively threaded applications by reducing the storage management overhead. A stack is allocated for each thread. The specifics of stack management are implementation dependent. However, a stack size always has to be big enough to handle a wide range of potential calling patterns and therefore, it is always much larger than the actual data space required to store the data.

In a multithreaded environment the discrete state of a process is indeterminable. Moreover, the value an entity shared across multiple threads cannot be precisely determined. Thus, the principle of multithreading is not only complex and hence error-prone, but also inefficient. Several reasons that make multithreading error prone include deadlocks, race conditions, failure of synchronization, and so on.

Most importantly, in the case of processors that do not support hyper threading and similar techniques, multithreading is just an illusion of concurrency. The operating system provides the illusion of concurrency by rapidly switching between multiple threads of execution running on the server-computational node at a predefined interval of time, called a time slice. The length of the time slice for which a thread of execution is allowed to use the processor becomes an important parameter for a system designer. The time slice has to be small enough so that the end user actually gets the illusion of concurrency, and at the same time it has to be large enough for a program to complete a meaningful amount of work per time slice. Moreover, the switching of threads burdens the system with additional overheads and degrades the performance.

In light of the above discussion, there is need to address the numerous problems related to a multithreaded remote procedure call system.

SUMMARY

An object of the present invention is to manage a remote procedure call system in a distributed computing system.

Another object of the invention is to implement a single thread of execution based event-driven remote procedure call system.

Yet another object of the invention is to improve the efficiency of server side processing in remote procedure call systems.

The present invention implements a remote procedure call system in which a server-computational node handles multiple client requests by using a single thread of execution. The server-computational node receives a client request by using a ticket. A ticket is an entity representing a logical event-driven activity. Each ticket performs a specified task for which it is created. At the completion of the specified task of the ticket, the ticket is deleted. The ticket also issues a new ticket that performs the next step in processing the remote procedure call request. This process is repeated till the time the server-computational node finally writes a remote procedure call reply to the remote procedure call request, and the connection between the client-computational node and the server-computational node is closed.

Therefore, the present invention offers an efficient alternative from a multi-threaded approach to a single-threaded environment for implementing the remote procedure call system. All the system overheads and other problems associated with a multithreaded approach are thus overcome.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF PREFERRED EMBODIMENTS

Various embodiments of the present invention provide method, system and computer program products for implementing an event-based remote procedure call system in a distributed computing system.

Figure 1:
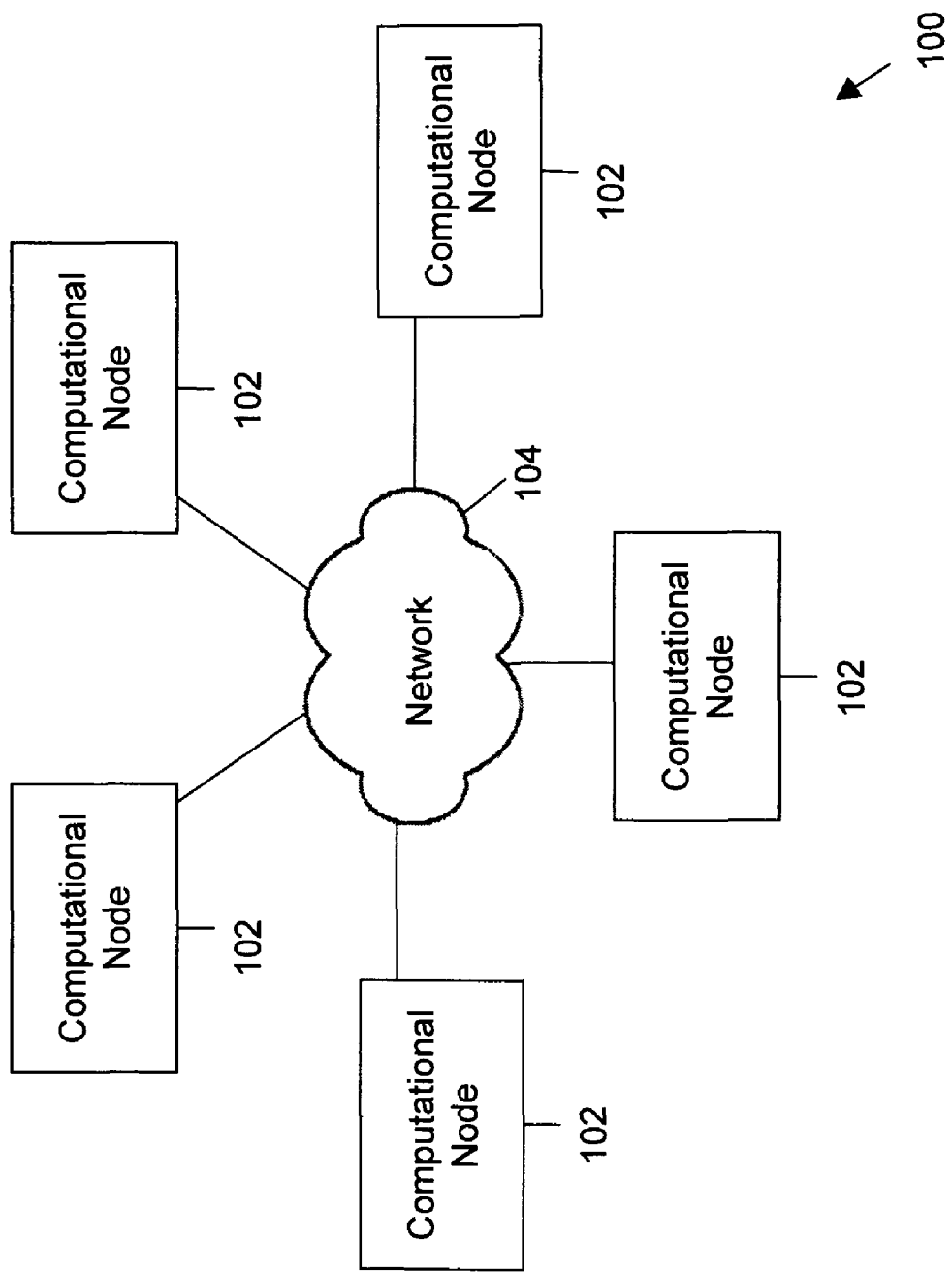
FIG. 1 is a block diagram illustrating a distributed computing system in which the various embodiments of the present invention may be implemented.

FIG. 1 is a block diagram illustrating a distributed computing system 100 in which various embodiments of the present invention may be implemented. Distributed computing system 100 includes a plurality of computational nodes 102a, 102b, 102c, 102d, and 102e. Distributed computing system 100 also includes a network 104.

Distributed computing system 100 enables processing of different parts of an application on a plurality of processors located on one or more computational nodes. Each of computational nodes 102a, 102b, 102c, 102d, and 102e (hereinafter referred to as computational nodes 102) is a general-purpose computational device. Examples of computational devices include mainframe computers, minicomputers, engineering workstations, desktop personal computers, laptops, and so forth.

Computational nodes 102 are connected to network 104. Examples of network 104 include a Local Area Network (LAN), a Wide Area Network (WAN), a wireless network, other Internet-enabled networks, and so forth. Computational nodes 102 are connected to network 104 with the help of connecting media. Examples of connecting media include a physical wire connection, wireless communication, and so forth.

Distributed computing system 100 may be implemented in any of a variety of architectures, including, a 2-tier architecture (client-server architecture), a 3-tier architecture, an N-tier architecture, a peer-to-peer architecture, a tightly-coupled architecture, a service-oriented architecture, a mobile-code-based architecture, and a replicated-repository-based architecture. Those skilled in the art will recognize that the present invention, as will be described below with reference to the 2-tier (client-server) architecture, can be implemented in any of the variety of architectures mentioned above.

Figure 2:
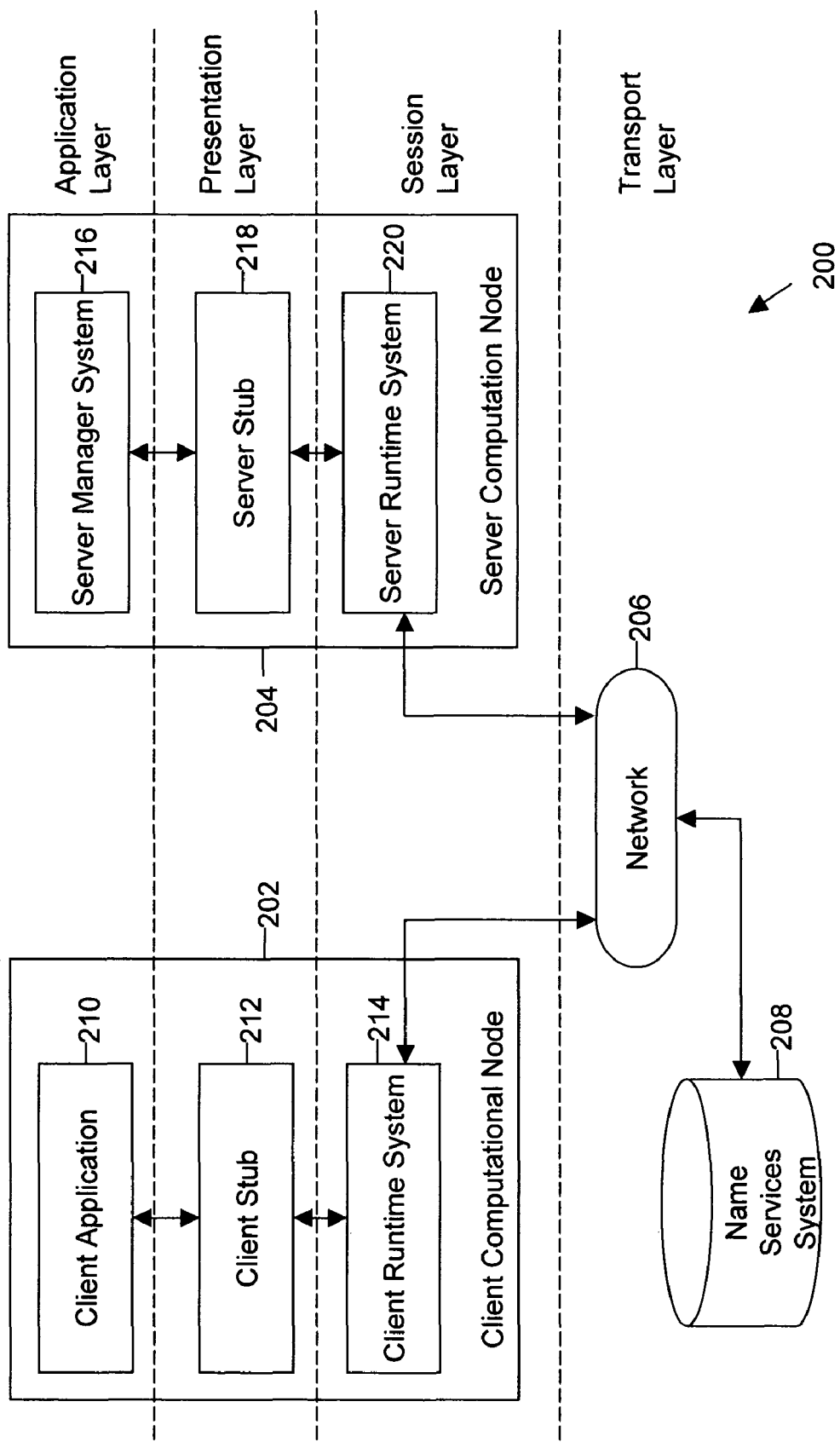
FIG. 2 is a block diagram illustrating a client-server model of the distributed computing system, in accordance with an embodiment the present invention.

FIG. 2 is a block diagram illustrating the client-server architecture 200 of the distributed computing system 100, in accordance with an embodiment of the present invention.

Client-server architecture 200 includes a client-computational node 202, a server-computational node 204, a network 206, and a name services system 208. Client-computational node 202 includes a client application 210, a client stub 212, and a client runtime system 214. Server-computational node 204 includes a server manager system 216, a server stub 218, and a server runtime system 220.

Server-computational node 204 exports information pertaining to procedures residing on server-computational node 204 to name services system 208. Client-computational node 202 imports information relating to the procedures residing on server-computational node 204 from name services system 208.

Client-computational node 202 generates a remote procedure call request for a procedure residing on server-computational node 204. Network 206 routes the remote procedure call request to server-computational node 204.

Client application 210 is an application program running on client-computational node 202. Client application 210 generates a request for a procedure. In an embodiment of the present invention, the request generated is similar to a local procedure call. Client application 210 passes a set of parameters along with the request to client stub 212. In an embodiment of the present invention, client application 210 also includes a unique identifier that uniquely identifies a procedure in a server manager system. Client stub 212 marshals the parameters and includes all such information as is necessary to execute the requested procedure. Client stub 212 thereafter passes the request to client runtime system 214, which casts the request into a remote procedure call request and transfers the request to server runtime system 220 by using network 208.

Server runtime system 220 receives the remote procedure call request and passes the request to server stub 218. Server stub 218 unmarshals the parameters in the remote procedure call request and passes the request to server manager system 216. Server manager system 216 invokes the requested procedure associated with an appropriate manager (not shown in the figure).

Server manager system 216 passes the result of processing the procedure as a reply to server stub 218. Server stub 218 marshals the result and passes the reply to server runtime system 220. Server runtime system 220 casts the reply into a remote procedure call reply and transfers the remote procedure call reply to client runtime system 214 by using network 206.

Client runtime system 214 receives the remote procedure call reply and passes the remote procedure call reply to client stub 212. Client stub 212 unmarshals the result in the remote procedure call reply and passes the result to client application 210.

Server stub 218 and client stub 212 are codes generated by using an interface definition language (IDL) compiler. In an embodiment of the present invention, an application programmer generates an interface, using which a server procedure is invoked. The interface code is written by using an interface definition language (IDL). The interface code is thereafter compiled by using the IDL compiler. The IDL compiler generates two compiled codes in the form of client stub 212 and server stub 218. Therefore, client stub 212 and server stub 218 are application specific codes. However, from an application programmer's point of view, they act as a separate transparent layer to implement the remote procedure call.

Network 206 is a network of computational devices, as described in conjunction with FIG. 1. Name services system 208 stores the information pertaining to the procedures residing in a computational node such as server-computational node 204. The computational node, such as server-computational node 204, exports information relating to such procedures that the computational node offers to other computational nodes in distributed computer system 100. Computational nodes such as client-computational node 202 import information of such procedures that the computational node requires for running an application, such as client application 210, from name services system 208. In an embodiment of the present invention, name services system 208 serves as a central repository for all such procedures that can be remotely invoked from a first computational node to a second computational node. In an embodiment of the present invention, distributed computing system 100 includes a plurality of name services systems.

In an embodiment of the present invention, server-computational node 204 sends a remote procedure call request to a third computational node in the manner described above. Therefore, server-computational node 204 acts as a client-computational node, and the third server-computational node acts as a server-computational node.

Therefore, with reference to an Open System Interconnection (OSI) model, client application 210 and server manager system 216 together, form the application layer. Client stub 212 and server stub 218 together, form the presentation layer. Client runtime system 214 and server runtime system 220 together, form the session layer. Network 206 and network interface component of client runtime system 214 (not shown in the figure) and network interface component of server runtime system 220 (not shown in the figure) together, form the transport layer.

Figure 3:
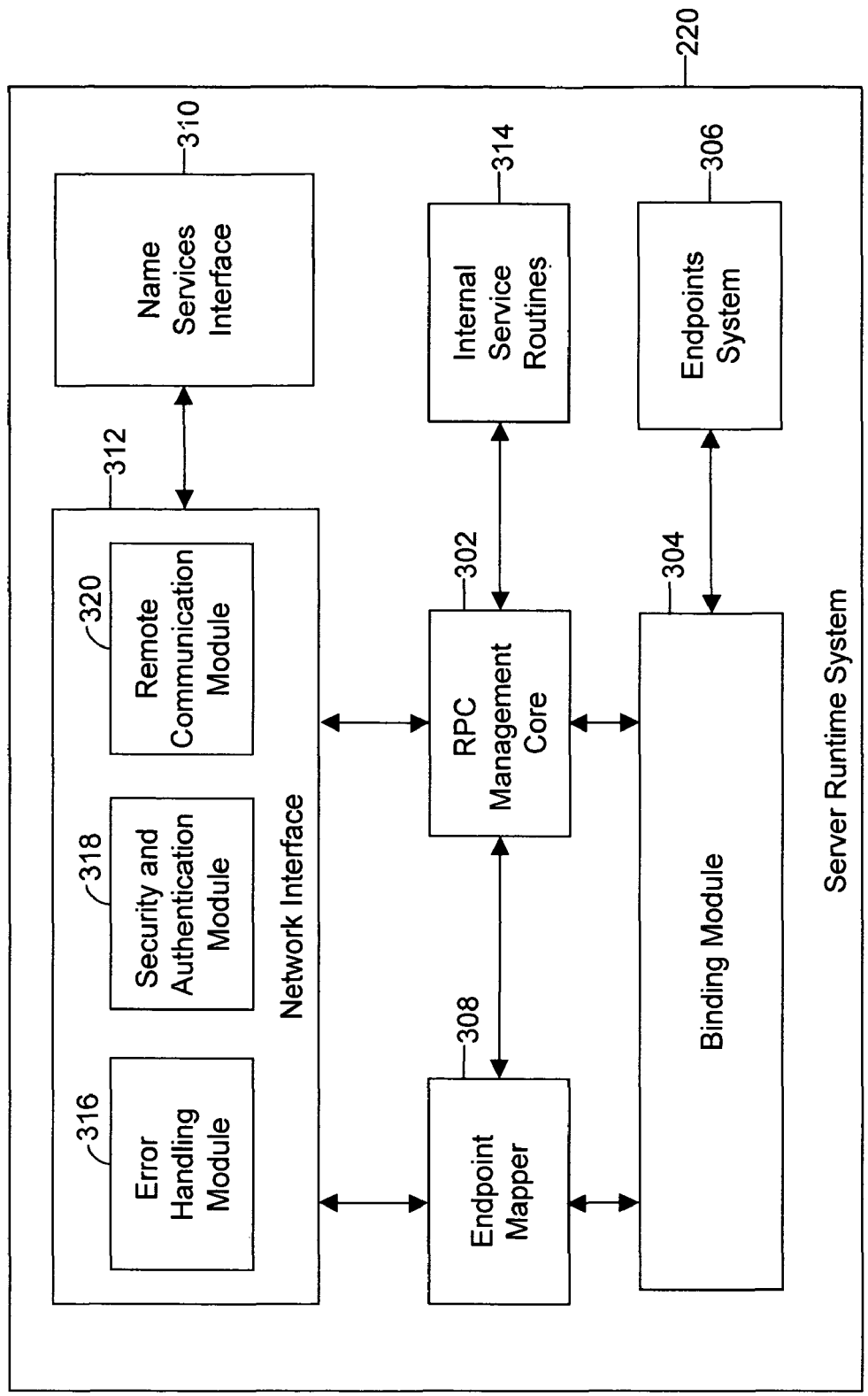
FIG. 3 is a functional block diagram illustrating a structure of a server runtime system, in accordance with an embodiment of the present invention.

FIG. 3 is a functional block diagram illustrating a structure of a server runtime system 220, in accordance with an embodiment of the present invention.

Server runtime system 220 includes an RPC management core 302, a binding module 304, an endpoints system 306, an endpoint mapper 308, a name-services interface 310, and a network interface 312. Network interface 312 includes an error-handling module 316, a security and authentication system 318, and a remote communication module 320.

RPC management core 302 controls the configuration of the components of server runtime system 220, including, for example, network interface 312. RPC management core 302 provides an RPC application-programming interface (API) to a network administrator of distributed computing system 100.

Binding module 304 includes information pertaining to the binding-related state of server-computational node 204. The binding-related state provides information that is necessary to invoke a desired procedure of a desired manager in server manager system 216. The binding-related state includes information such as protocol sequence, protocol version, transfer syntax, server address, endpoint, and other implementation-dependent information. Binding module 304 further includes client-binding information identifying client-computational node 202 to server-computational node 204.

Endpoints system 306 includes a set of endpoints. An endpoint is an address of a specific server instance located on server-computational node 204 on which the specific server instance receives a remote procedure call request. In an embodiment of the present invention, the endpoints are well-known endpoints that are assigned to server instances located on server-computational node 204. In another embodiment of the present invention, the endpoints also include dynamic endpoints, which are dynamically assigned at runtime. Endpoint mapper 308 is a service that maintains a record of dynamic endpoints. Binding module 304 registers information related to interfaces, interface versions, and other such information that is necessary to invoke a desired procedure on the server-computational node with endpoint mapper 308. In an embodiment of the present invention, endpoint mapper 308 has a well-defined endpoint.

Name services interface 310 provides an interface to name services system 208. Name services interface 310 is used to export information related to such procedures that server-computational node 204 provides to other computational nodes located in distributed computing system 100.

Network interface 312 provides an interface for all communication between server-computational node 204 and a remote computational node, including, for example, client-computational node 202. Remote communication module 320 implements a protocol tower for protocols used for different layers of communication between server-computational node 204 and client-computational node 202. The transport protocols used include Transmission Control Protocol/Internet Protocol (TCP/IP), Universal Datagram Protocol/Internet Protocol (UDP/IP), Internet Packet Exchange/Sequenced Packet Exchange (IPX/SPX), Network Basic Input/Output System (NetBIOS), NetBIOS Extended User Interface (NETBEUI), Hyper Text Transfer Protocol (HTTP), DCEnet3.0, Server Message Block (SMB) and so forth.

Error-handling module 316 implements error handling in network communication. Errors that occur in the remote procedure call system include, for example, time-outs, lost connection, and so forth. Security and authentication module 318 is used to implement authentication and authorization services. Server and authentication module 318 is also used to establish authorization levels for remote procedure calls.

Internal service routines 314 include procedures that may be used frequently. Therefore, to improve the performance of server-computational node 204, these procedures are included in server runtime system 220. The procedures include program and storage management services, time-of-day services, and similar system services. These procedures also include initialization and control routines used by RPC management core 302.

Figure 4:
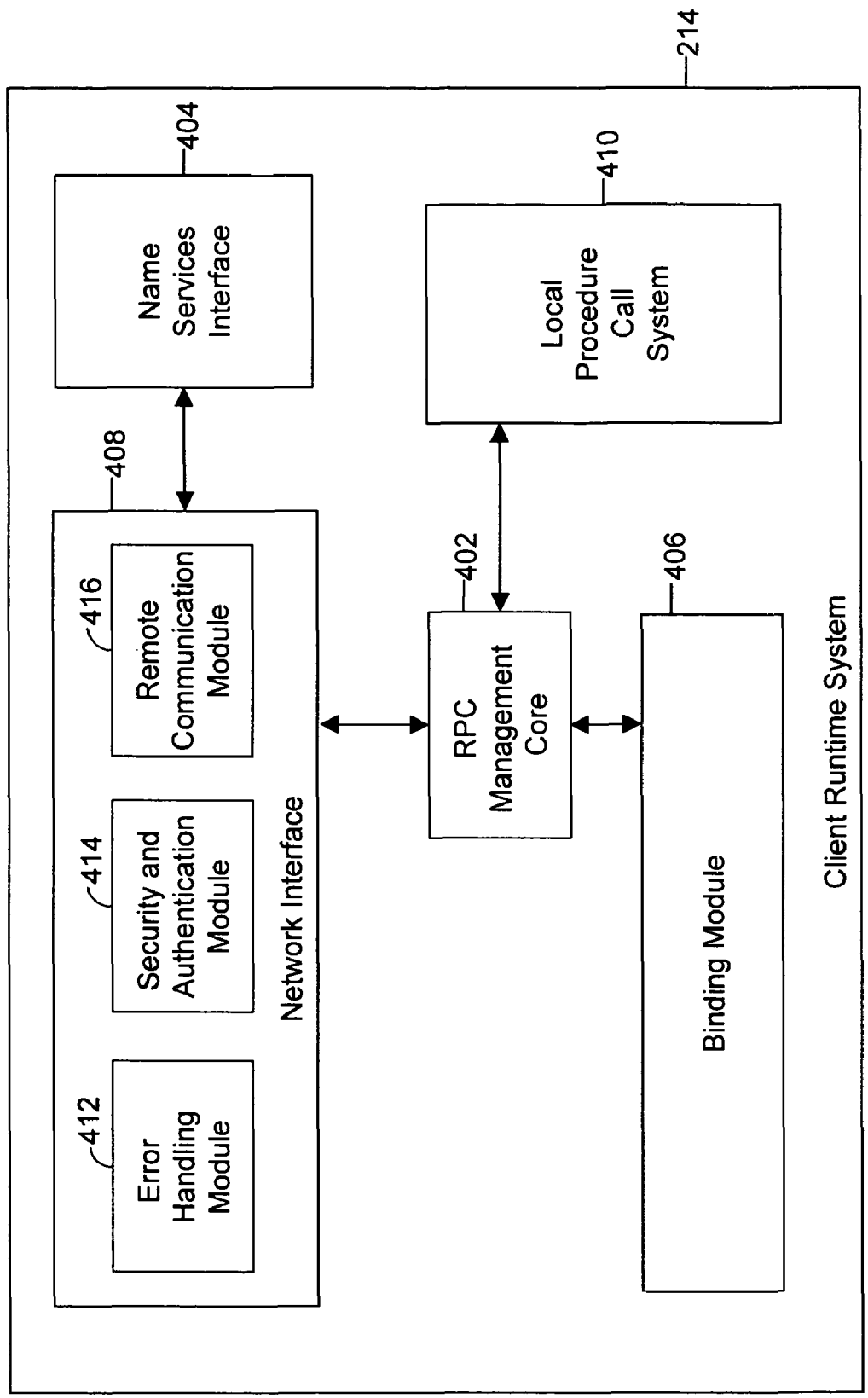
FIG. 4 is a functional block diagram illustrating a structure of a client runtime system, in accordance with an embodiment of the present invention.

FIG. 4 is a functional block diagram illustrating a structure of a client runtime system 214, in accordance with an embodiment of the present invention.

Client runtime system 214 includes an RPC management core 402, a name services interface 404, a binding module 406, a network interface 408, and a local procedure call system 410. Network interface 408 includes an error-handling module 412, a security and authentication module 414, and a remote communication module 416.

RPC management core 402 controls the configuration of the components of client runtime system 214, including, for example, network interface 408. RPC management core 402 provides an RPC application-programming interface (API) to a network administrator of distributed computing system 100.

Name-services interface 404 provides an interface to name services system 208. Name-services interface 404 is used to import binding information related to such procedures that server-computational node 204 offers to other computational nodes located in distributed computing system 100.

Binding module 406 contains information pertaining to the binding-related state of client-computational node 202. The binding-related state provides information that is necessary to invoke a desired procedure of a desired manager in server manager system 216. The binding-related state includes such information as protocol sequence, protocol version, transfer syntax, server address, endpoint, and other implementation-dependent information. Binding module 304 also includes server-binding information identifying server-computational node 204 to client-computational node 202.

Network interface 408 provides an interface for all communication between client-computational node 202 and server-computational node 204. Remote communication module 416 implements the protocol tower for protocols used for different layers of communication between server-computational node 204 and client-computational node 202. The transport protocols used include TCP/IP, UDP/IP, IPX/SPX, NetBIOS, NETBEUI, HTTP, DCEnet3.0, SMB, and so forth.

Error-handling module 412 implements error-handling in network communication. Errors that occur in the remote procedure call system include, for example, time-outs, lost connection, and so forth. Security and authentication module 414 implements authentication and authorization services. Further, server and authentication module 414 also establishes authorization levels for remote procedure calls.

Local procedure call system 410 invokes a procedure on client-computational node 202. When client application 210 makes a request for a procedure that resides locally on client-computational node 202, RPC management core 402 invokes local procedure call system 410. Therefore, client runtime system 214 provides complete transparency to client application 210 with respect to a procedure call. If the procedure is located on a remote computational node, the request is routed to an appropriate computational node registered with the name services system for providing the service. However, if the procedure is located on the same node from where the request originates, it is invoked locally without invoking a remote procedure call.

Figure 5:
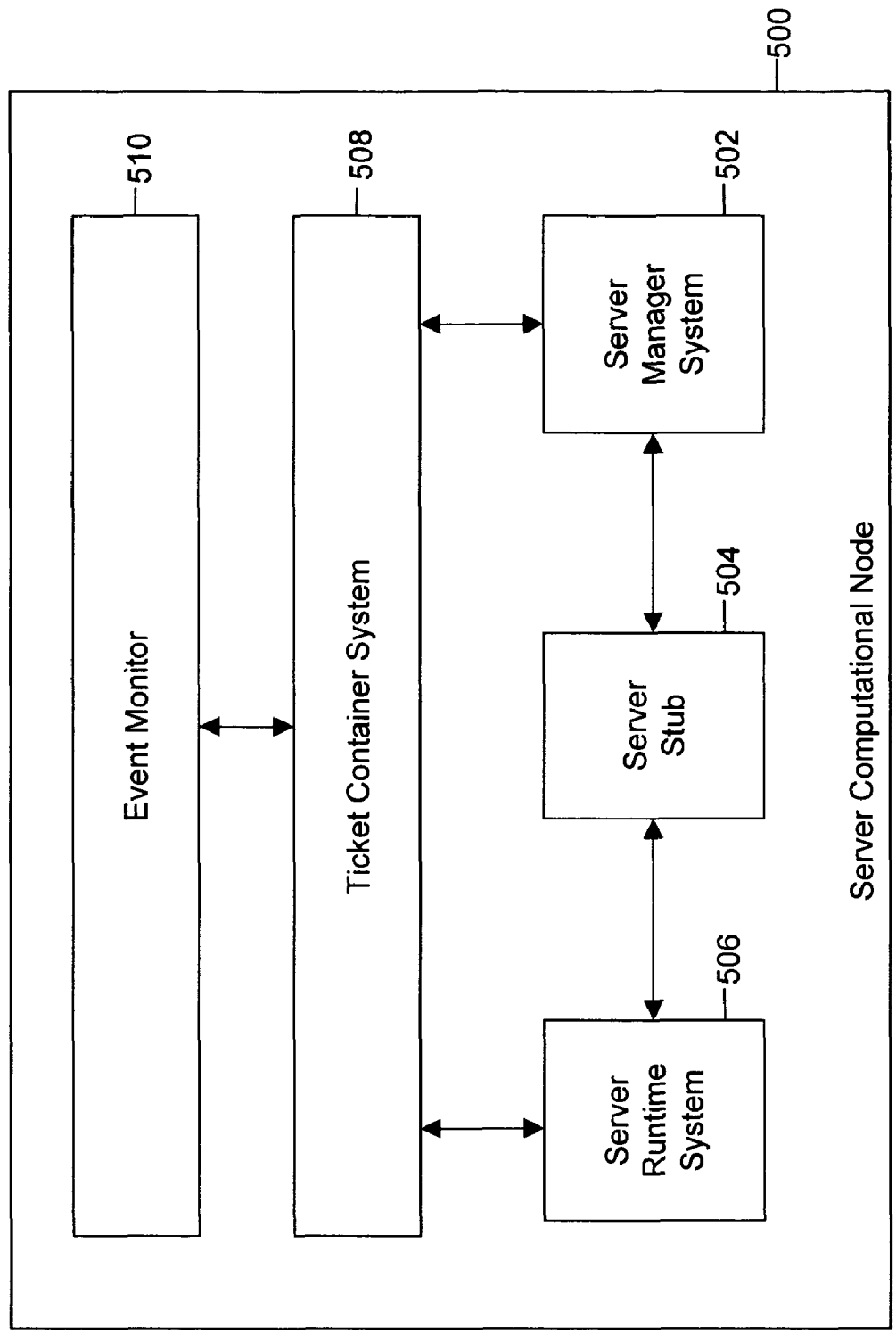
FIG. 5 is a block diagram illustrating a structure of a server-computational node, in accordance with an embodiment of the present invention.

FIG. 5 is a functional block diagram illustrating a structure of a server-computational node 500, in accordance with an embodiment of the present invention.

Server-computational node 500 includes a server manager system 502, a server stub 504, a server runtime system 506, a ticket container system 508, and an event monitor 510.

Server manager system 502, server stub 504, and server runtime system 506 submit tickets in ticket container system 508. Event monitor 510 keeps track of all events occurring in the system, and changes the status of tickets residing in ticket container system 508, based on the events.

In an embodiment of the present invention, the server-computational node 500 has a single thread of execution to implement the RPC system at the server-computational node. The activities performed by the components of server-computational node 500, as described herein, are performed by using the single thread of execution.

Server manager system 502, server stub 504, and server runtime system 506 share the single thread of execution. Therefore, to process a request in such a single threaded environment, tickets are used. A ticket is an entity that includes the contextual information related to a request and other such information, as may be necessary for processing a request. The ticket also includes information relating to functions, which operate on data contained in the ticket. Therefore, the ticket is an entity that helps the remote procedure call components constituting the server-computational node to process a remote procedure call request by using the single thread of execution.

During the course of processing a request, when server manager system 502, server stub 504, and server runtime system 506 come to a point where it is necessary to wait for some activity to be completed, a ticket 't' submitted to ticket container system 508. The ticket 't' thus generated waits for the activity to complete. At this point in time, the ticket 't' is ineligible for being processed and it is in 'inactive and ineligible' state. The single thread of execution invokes ticket container system 508 to identify tickets, which are eligible for processing at that point in time. The single thread of execution invokes one of the tickets that are eligible for processing, based on a predefined criterion.

An event is generated at the instant the activity for which ticket 't' is waiting is completed. Subsequently, event monitor 510 marks the ticket 't' as eligible. At a later point of time, the single thread of execution invokes ticket 't', and therefore, processing for the request continues asynchronously, based on an event-driven mechanism.

In an embodiment of the present invention, the system is implemented by using two threads, which share processor time, based on a predefined criterion. In an another embodiment of the present invention, one of the two threads is a low-priority thread and the other is a high-priority thread. The two threads share the processor time, based on the relative priority of the two threads. In another embodiment of the present invention, a plurality of threads is used, sharing the processor time, in accordance with a predefined criterion.

In another embodiment of the present invention, server-computational node 500 is implemented by using multiple processors. Each of the processors has a single thread of execution running on it. In yet another embodiment, one or more of the processors have a plurality of threads of execution, sharing the processor time according to a predefined criterion.

Procedures included in internal service routines 314, described in conjunction with FIG. 3, as well as procedures implemented in managers of service manger system 502, are logically broken down into a plurality of parts, based on two criteria. The first is as follows: Whenever a procedure makes an I/O system call for which the procedure has to wait for further processing till the call returns, it stops executing and issues a new ticket in which it passes the context of the processing being performed. The new ticket thus issued becomes eligible for processing when the call returns; event monitor 510 captures the return of the call, and processing of the new ticket is started at a later point of time when the single thread of execution decides to invoke the ticket, based on a predefined criterion.

The second is as follows: When a procedure exceeds a predefined amount of time of execution, the execution of the procedure is stopped and a new ticket is generated in which the contextual information of the processing performed till that point in time is saved.

In another embodiment of the present invention, in addition to the single thread of execution as described above, the server-computational node spawns one or more auxiliary threads. The one or more auxiliary threads are assigned to perform auxiliary services as desired.

Figure 6:
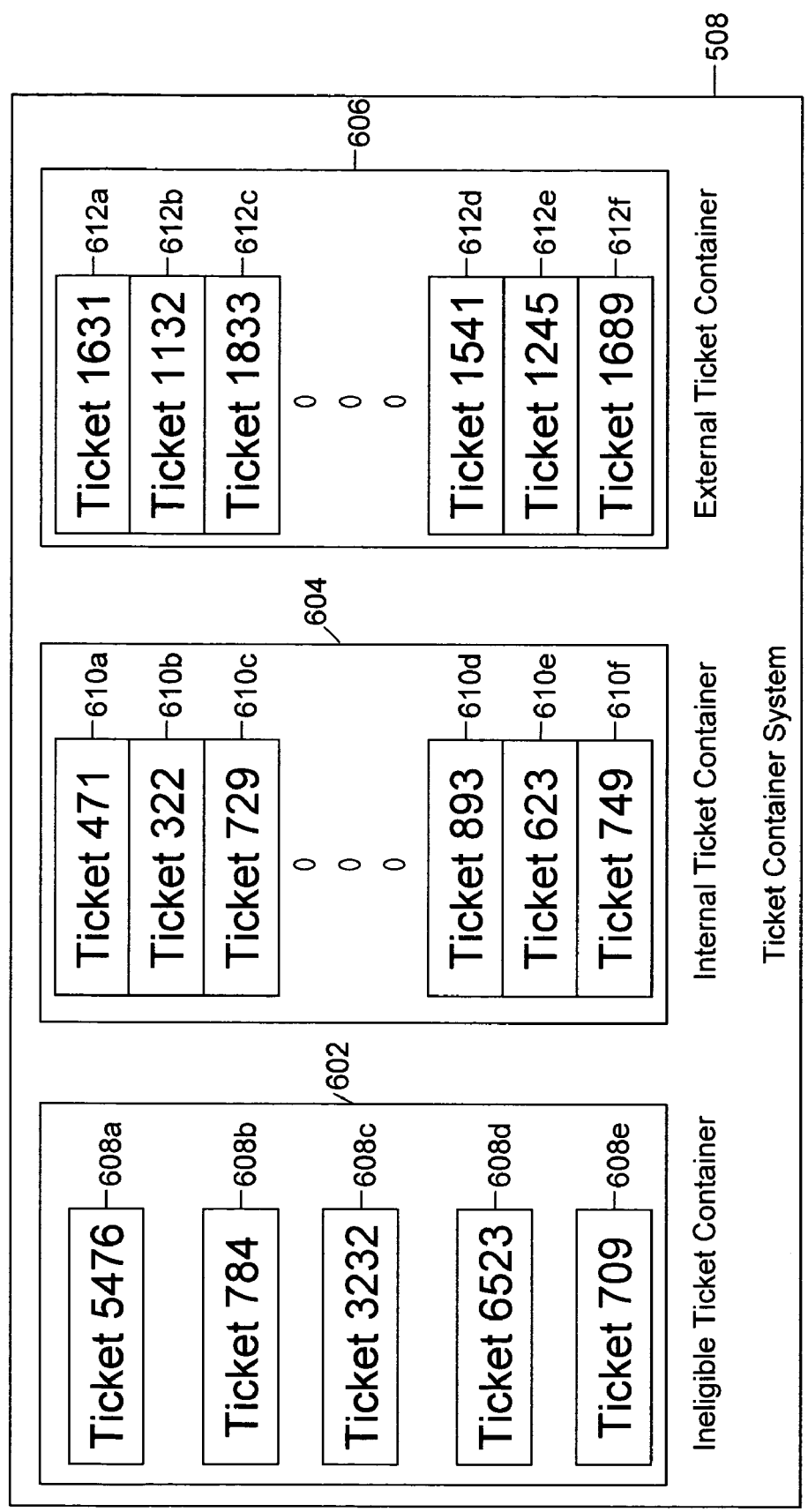
FIG. 6 is a block diagram illustrating a structure of a ticket container system, in accordance with an embodiment of the present invention.

FIG. 6 is a block diagram illustrating a structure of a ticket container system 508, in accordance with an embodiment of the present invention.

Ticket container system 508 includes an ineligible ticket container 602, an internal ticket container 604, and an external ticket container 606. Ineligible ticket container 602 includes a plurality of tickets 608a, 608b, 608c, 608d, and 608e. Similarly, internal ticket container 604 includes a plurality of tickets 610a, 610b, 610c, 610d, 610e, and 610f. Similarly, external ticket container 606 includes a plurality of tickets 612a, 612b, 612c, 612d, 612e and 612f.

In an embodiment of the present invention, each ticket has a ticket identity provided by a number, for example, ticket 608a has an identity 5476, and so on.

A ticket, which is waiting for an event in the system to occur, such as the return of a system call, is ineligible and resides in ineligible ticket container 602. At the instant that the event occurs, event monitor 510 captures the event, and thereafter, if the ticket is related to processing on the local node the ticket is transferred from ineligible ticket container 602 to internal ticket container 604. If the ticket is related to processing on a remote node, it is transferred to external ticket container 606.

In an embodiment of the present invention, internal ticket container 604 and external ticket container 606 are implemented as data queues. Therefore, the tickets that are eligible for processing are processed on a first-in first-out basis.

In another embodiment of the present invention, the single thread of execution for processing of the remote procedure call request running on server-computational node 204 invokes a ticket, based on a value of λ wherein λ is defined by the following mathematical function:

$$\lambda = f(t, \tau)$$

where t is the time elapsed since the ticket became eligible for processing and τ is the approximate time required to process the ticket.

In an embodiment of the present invention, λ varies directly with value of t. Further λ varies inversely with value of τ.

In yet another embodiment of the present invention, the single thread of execution schedules the eligible tickets in accordance with a suitable algorithm based on specific usage patterns.

Figure 7:
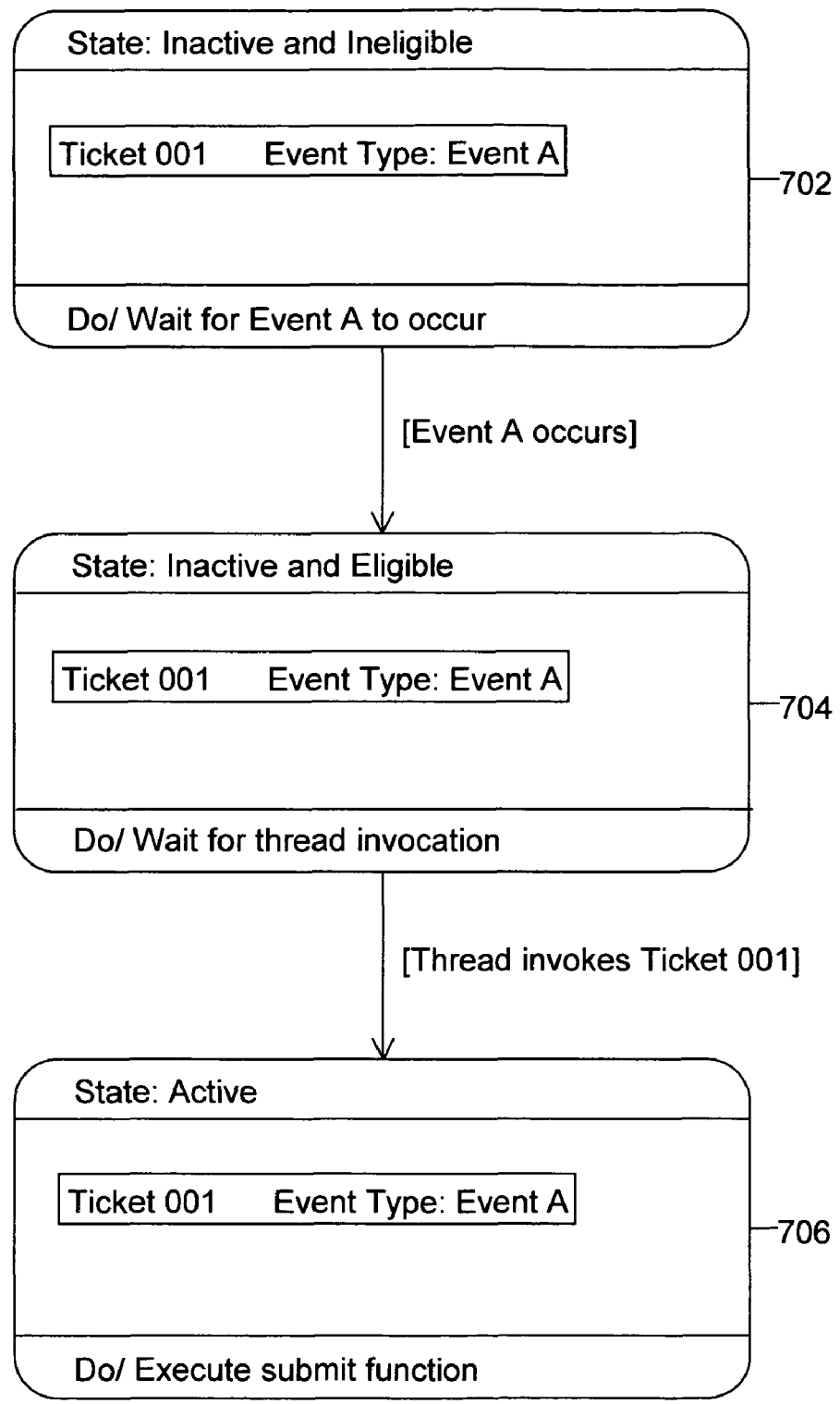
FIG. 7 is a block diagram illustrating a state transition of a ticket, in accordance with an embodiment of the present invention.

FIG. 7 is a block diagram illustrating a state transition of a ticket, in accordance with an embodiment of the present invention. FIG. 7 shows state 702, state 704, and state 706 of the ticket.

State 702 shows a ticket 001 that waits for an event A to occur. Ticket 001 is instantiated and waits for event A to occur. Therefore, ticket 001 is ineligible for processing, since event A has not occurred. Ticket 001 is then in an 'inactive and ineligible' state. When event A occurs, ticket 001 transitions from state 702 to state 704. Ticket 001 is eligible for processing, and waits for an invocation from the single thread of execution running on server-computational node 204. Ticket 001 is in then in an 'inactive and eligible' state. When the thread of execution starts processing ticket 001, ticket 001 transitions from state 704 to state 706. Ticket 001 is in then in an 'active' state.

In an embodiment of the present invention, a ticket passes through one or more states, as described in FIG. 7.

Figure 8:
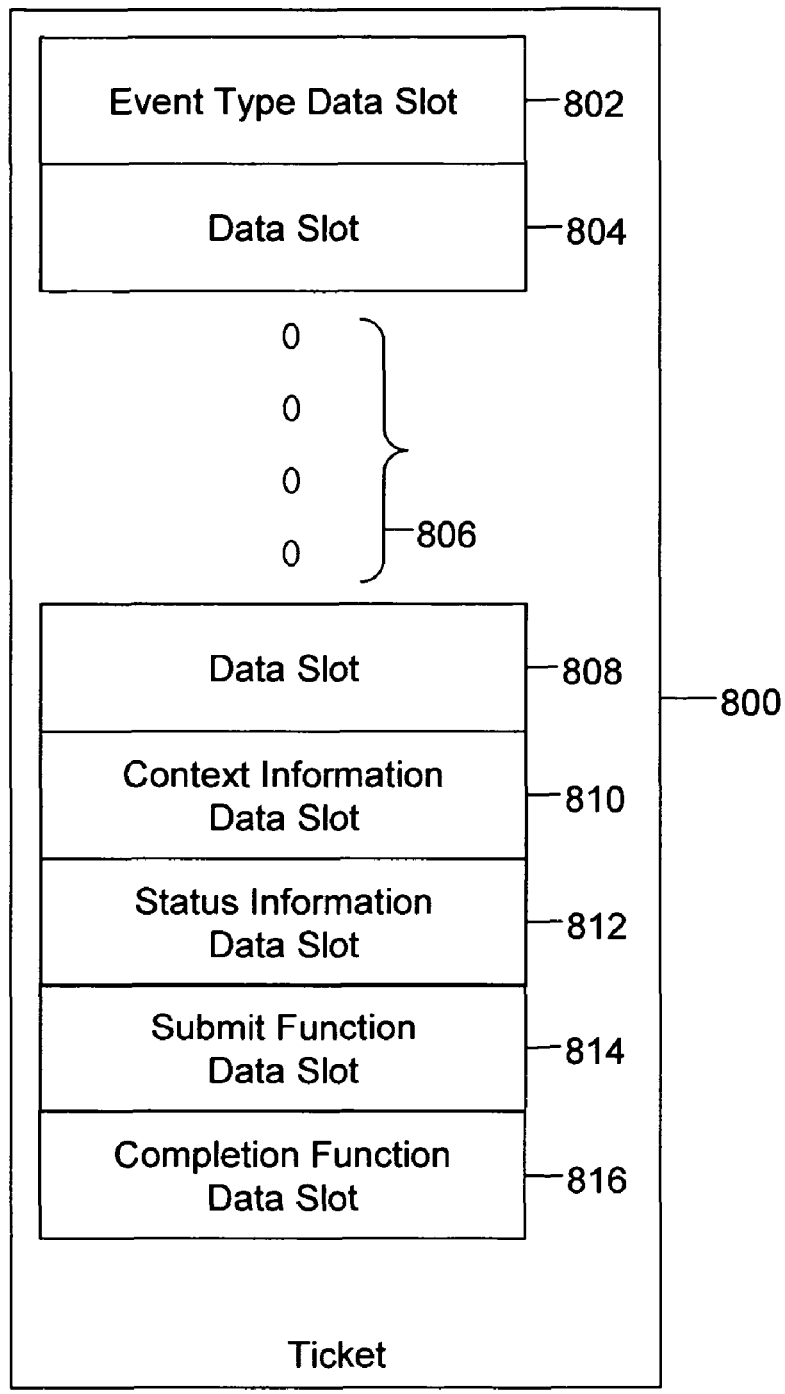
FIG. 8 is a block diagram illustrating a structure of the ticket, in accordance with an embodiment of the present invention.

FIG. 8 is a block diagram illustrating a structure of a ticket 800, in accordance with an embodiment of the present invention.

Ticket 800 includes an event-type data slot 802, a data slot 804, a series of data slots 806, a data slot 808, a contextual-information data slot 810, a status-information data slot 812, a submit-function data slot 814, and a completion-function data slot 816.

In an embodiment of the present invention, ticket 800 is implemented as a data structure. Event-type data slot 802 stores information of an event for which ticket 800 is waiting. Data slot 804, data slot 808, and a series of data slots 806 represent data slots used to store such information as is necessary to process ticket 800 and other relevant information.

Contextual information data slot 810 saves contextual information of a remote procedure call request. When ticket 800 generates a new ticket, it passes the contextual information included in it to the new ticket. The new ticket saves the contextual information in the contextual-information data slot. The new ticket also keeps on updating the contextual information during the course of processing.

Status information data slot 812 stores information related to status of ticket 800. In an embodiment of the present invention, the status of ticket 800 is ineligible, eligible, fault, and cancelled.

Submit function data slot 814 stores information that associates a submit function with ticket 800. In an embodiment of the present invention, submit function data slot 814 stores a pointer that points to a submit function stored in a memory block. In an embodiment of the present invention, the single thread of execution running on server-computational node 204 invokes ticket 800 by calling the submit function. The submit function, therefore, starts the processing of ticket 800.

Completion function data slot 816 stores information that associates a completion function with ticket 800. In an embodiment of the present invention, completion function data slot 816 stores a pointer that points to a completion function stored in a memory block. In an embodiment of the present invention, the completion function receives the result of the processing of ticket 800. The completion function further invokes a new ticket if the processing of the remote procedure call request is not complete. The completion function passes the contextual information stored in contextual information data slot 810 to the new ticket. In an embodiment of the present invention, the completion function finally deletes ticket 800.

Figure 9:
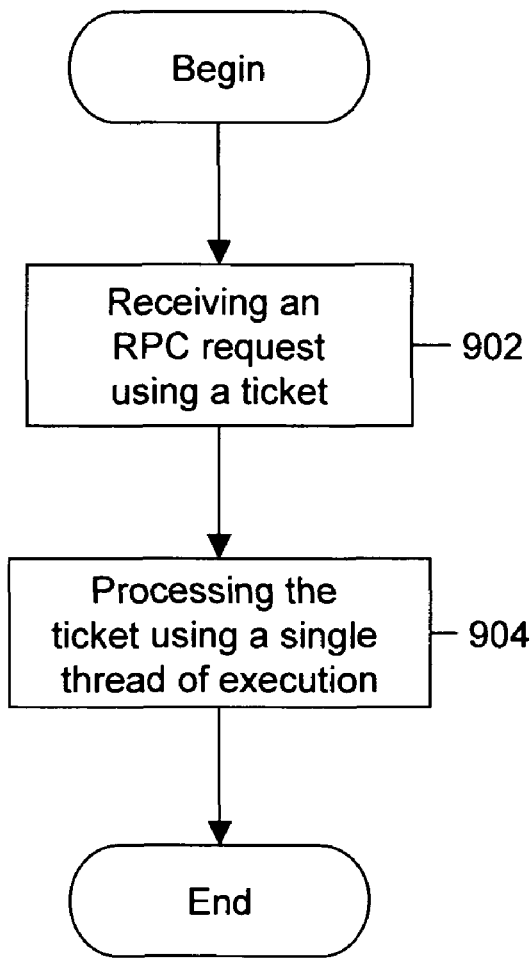
FIG. 9 is a flowchart illustrating a method for implementing an event-based remote procedure call system in a distributed computing system, in accordance with an embodiment of the present invention.

FIG. 9 is a flowchart illustrating a method for implementing an event-based remote procedure call system in a distributed computing system 100, in accordance with an embodiment of the present invention.

At 902, a remote procedure call (RPC) request is received by using a ticket. In an embodiment of the present invention, a connect ticket is instantiated for an endpoint and submitted to ticket container 508. The connect ticket waits for client computational node 202 to send an RPC request.

At 904, the ticket is processed based on an asynchronous event-driven mechanism by using a single thread of execution. When the RPC request arrives, the connect ticket becomes eligible to be processed. The single thread of execution running at server-computational node 204 invokes the connect ticket and starts processing. The processing of the connect ticket establishes a connection between client-computational node 202 and server-computational node 204. Once the connection is established, the task of the connect ticket is complete, and a completion function of the ticket is called. The completion function of the connect ticket submits a new ticket and deletes the connect ticket. The new ticket is processed in a similar manner. This process of a ticket submitting a new ticket and subsequent processing of the new ticket continues till the request is processed. Thereafter, a write ticket is submitted. The write ticket, when processed, writes the result of the processing of the RPC request on the connection established between the client-computational node 202 and server-computational node 204. Finally, a close connection ticket is submitted. The close connection ticket, when processed, closes the connection established between the client-computational node 202 and server-computational node 204.

Figure 10:
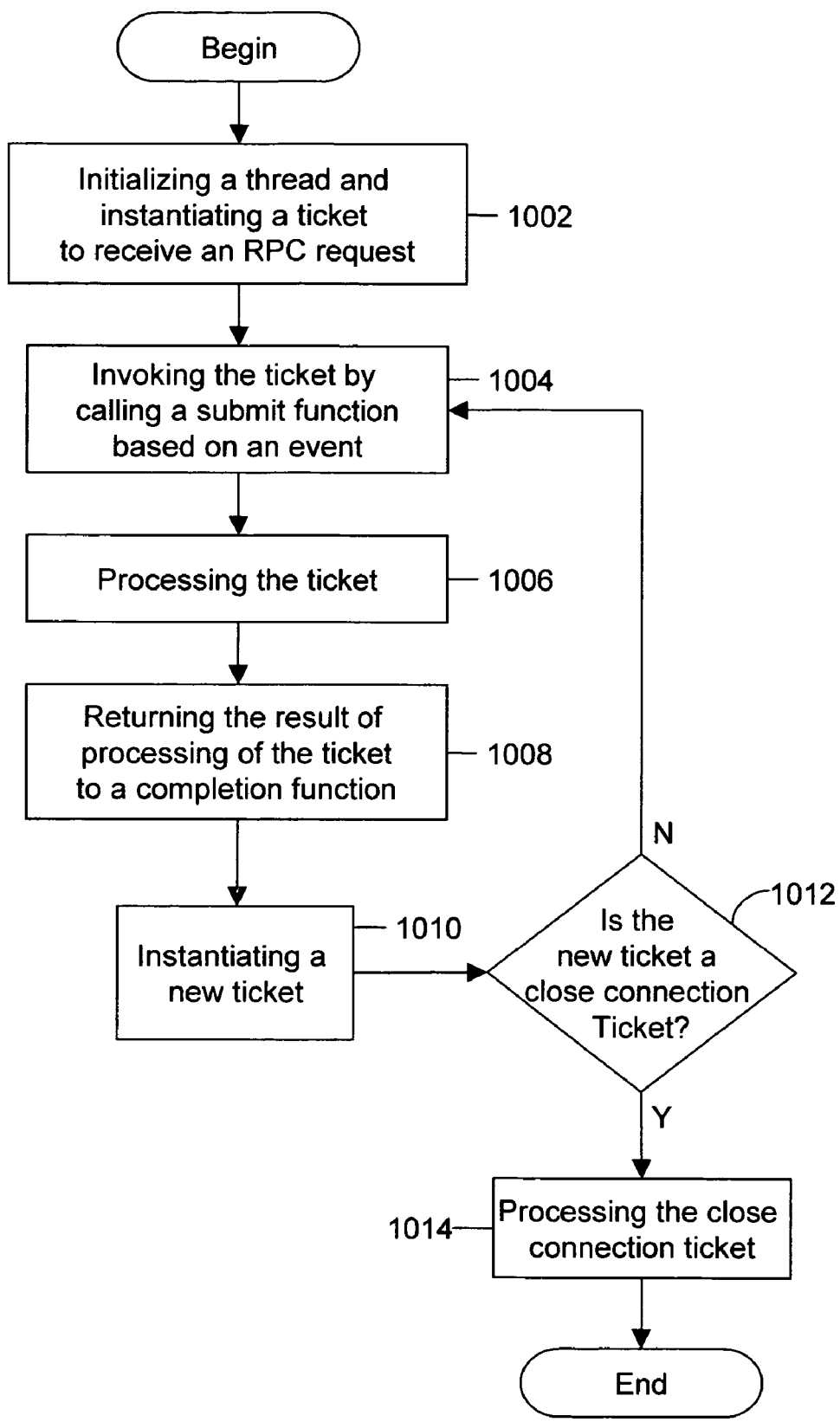
FIG. 10 is a flowchart illustrating a method for implementing the event-based remote procedure call system in a distributed computing system, in accordance with an alternate embodiment of the present invention.

FIG. 10 is a flowchart illustrating a method for implementing an event-based remote procedure call system in a distributed computing system 100, in accordance with an alternate embodiment of the present invention.

At 1002, a thread of the execution starts running, the server runtime system is initialized, and defaults are set. Further, a connect ticket is instantiated to receive an RPC request. At 1004, an RPC request is received, using the connect ticket by invoking the submit function associated with the connect ticket. At 1006, processing of the connect ticket is performed by the thread of execution. At 1008, the result of the processing is returned to a completion function associated with the connect ticket.

At 1010, the completion function submits a new ticket, which embodies a logical next step in the processing of the RPC request, the new ticket obtaining contextual information pertaining to the RPC request from the connect ticket.

At 1012, the new ticket submitted at 1010 is analyzed. If the new ticket is not a close-connection ticket, it is processed in a similar manner as the method by which the connect ticket is processed. If the new ticket is a close-connection ticket, the close-connection ticket is processed and the connection is closed at 1014.

In accordance with an embodiment of the present invention, the connect ticket also instantiates a new connect ticket along with the new ticket at 1010. The new connect ticket waits for a new RPC request.

The event-based remote procedure call system, described here, thus offers an advantage of being a single-threaded implementation of remote procedure call system. This shift from a multithreaded to a single-threaded environment for implementing the remote procedure call system reduces the complexities associated with a multithreaded system. The implementation of remote procedure call system becomes simpler and various errors associated with a multithreaded environment are reduced. The server-computational node becomes more efficient in processing remote procedure calls requests. System overheads such as separate stacks associated with individual threads and switching contexts for multiple threads are eliminated.

In addition to above, the present invention, facilitates the selection of an optimum scheduling algorithm based on application specific usage patterns on the server-computational node.

The present invention, thus offers a simpler and more efficient remote procedure call system that is easier to program, implement, and maintain.

While the preferred embodiments of the invention have been illustrated and described, it will be clear that it is not limited only to these embodiments. Numerous modifications, changes, variations, substitutions and equivalents will be apparent to those skilled in the art, without departing from the spirit and scope of the invention, as described in the claims.

What is claimed is:

1. A method for managing at least two remote procedure call requests in a distributed computing system, the distributed computing system comprising a plurality of computational nodes, one or more of the plurality of computational nodes functioning as server-computational nodes, and one or more of the plurality of computational nodes functioning as client-computational nodes, the method comprising:
   a. receiving each of the at least two remote procedure call requests at a server-computational node and
   b. serving each of the at least two remote procedure call requests through completion using a single thread of execution at the server-computational node, wherein
      the single thread of execution serves the at least two remote procedure call requests by processing one or more tickets instantiated for each of the at least two remote procedure call requests,
      each ticket is a data structure representing a logical event-driven activity associated with the respective remote procedure call request,
      each ticket is stored at a memory of the server-computational node and is processed by a processor coupled to the memory, and
      the processing of the one or more tickets using the single thread of execution comprises calling a function associated with each of the one or more tickets.

2. The method according to claim 1 further comprising initiating each of the at least two remote procedure call requests from at least one client-computational node.

3. The method according to claim 2, wherein the initiating of each of the at least two remote procedure call requests from the at least one client-computational node comprises:
   a. generating a request for a procedure residing at the server-computational node;
   b. converting the request for the procedure residing at the server-computational node to a remote procedure call request; and
   c. communicating the remote procedure call request to the server-computational node.

4. The method according to claim 3, wherein the generating of the request comprises including a unique identifier in the request, wherein the unique identifier uniquely identifies the procedure residing at the server-computational node.

5. The method according to claim 1, wherein the receiving of the at least two remote procedure call requests at the server-computational node comprises converting each of the at least two remote procedure call requests from a second data format to a third data format.

6. The method according to claim 1 further comprising logically partitioning a procedure residing at the server-computational node into a plurality of parts based on a first predefined criterion.

7. The method according to claim 1, wherein the processing of the one or more tickets is performed using an asynchronous event-driven mechanism using the single thread of execution.

8. The method according to claim 1, wherein the processing of the one or more tickets is performed using a scheduling algorithm, the scheduling algorithm being based on usage patterns on the server-computational node.

9. The method according to claim 1, wherein the processing of the one or more tickets further comprises deleting the one or more tickets.

10. The method according to claim 1, wherein the processing of the one or more tickets further comprises issuing at least one new ticket based on a second predefined criterion.

11. The method according to claim 10, wherein the processing of the one or more tickets further comprises processing the at least one new ticket based on an asynchronous event-driven mechanism using the single thread of execution.

12. A remote procedure call system for managing at least one remote procedure call request in a distributed computing system, the distributed computing system comprising a plurality of computational nodes, one or more of the plurality of computational nodes functioning as server-computational nodes, and one or more of the plurality of computational nodes functioning as client-computational nodes, the remote procedure call system comprising:
   a. a network interface component disposed at a server-computational node and configured to receive at least two remote procedure call requests from the one or more client-computational nodes;
   b. a server runtime system disposed at the server-computational node and configured to
      receive the at least two remote procedure call requests from the network interface component,
      instantiate at least one ticket for each of the at least two remote procedure call requests, wherein each ticket is a data structure representing a logical event-driven activity associated with the respective remote procedure call request, and store each ticket in a memory at the server-computational node;

c. an event monitor disposed at the server-computational node and configured to invoke each ticket; and d. a server manager system disposed at the server-computational node and configured to serve each of the at least two remote procedure call requests through completion using a single thread of execution, the single thread of execution serving the at least two remote procedure call requests through processing the tickets using the single thread of execution.

13. The remote procedure call system according to claim 12 further comprising:

a. a client runtime system to initiate one of the at least two remote procedure call requests; and b. a client stub to provide an interface between a client application and the client runtime system, the client application being an application running on the client-computational node, the client application generating a request for a procedure.

14. The remote procedure call system according to claim 13, wherein the client stub converts the request from a first data format to a second data format.

15. The remote procedure call system according to claim 14, wherein the first data format is implemented on the client-computational node.

16. The remote procedure call system according to claim 14, wherein the second data format is interpretable at the client-computational node and the server-computational node.

17. The remote procedure call system according to claim 12 further comprising a server stub to provide an interface between the server manager and the server runtime system.

18. The remote procedure call system according to claim 17, wherein the server stub converts the at least two remote procedure call requests from a second data format to a third data format.

19. The remote procedure call system according to claim 18, wherein the second data format is interpretable at the client-computational node and the server-computational node.

20. The remote procedure call system according to claim 18, wherein the third data format is implemented on the server-computational node.

21. The remote procedure call system according to claim 12 further comprising a ticket container to store the tickets, wherein the ticket container is a data structure.

22. The remote procedure call system according to claim 21, wherein the ticket container is a data queue.

23. The remote procedure call system according to claim 12 further comprising an internal ticket container to store the tickets, each ticket related to an internal service, the internal service being located on the server-computational node.

24. The remote procedure call system according to claim 12 further comprising an external ticket container to store at least one ticket related to an external service, the external service being located on a second server-computational node.

25. The remote procedure call system according to claim 12, wherein the server runtime system sends at least one remote procedure call reply using the single thread of execution.

26. The remote procedure call system according to claim 12, wherein the server manager system comprises at least one manager, the at least one manager comprising at least one procedure.

27. The remote procedure call system according to claim 26, wherein the at least one procedure is logically partitioned into a plurality of parts based on a third predefined criterion.

28. The remote procedure call system according to claim 12, wherein each ticket is processed using an asynchronous event-driven mechanism using the single thread of execution.

29. The remote procedure call system according to claim 12, wherein each ticket comprises information to process the ticket.

30. The remote procedure call system according to claim 12, wherein each ticket comprises one or more functions to process the ticket.

31. The remote procedure call system according to claim 30, wherein each ticket comprises a submit function to initiate processing of the ticket.

32. The remote procedure call system according to claim 30, wherein each ticket comprises a completion function to receive a result of processing of the ticket.

33. The remote procedure call system according to claim 32, wherein the completion function further deletes the ticket.

34. The remote procedure call system according to claim 32, wherein the completion function further issues at least one new ticket.

35. The remote procedure call system according to claim 12, wherein the event monitor invokes one or more of the tickets based on a fourth predefined criterion.

36. A physical computer readable medium encoded with at least two tickets, each ticket for processing a respective remote procedure call request, each ticket being a data structure representing an event driven activity associated with the processing of the respective remote procedure call request at a server-computational node, the physical computer readable medium encoding the at least two tickets comprising:

a. for each of the at least two tickets, at least one data slot for storing information to process the ticket; and b. for each of the at least two tickets, at least one reference to a function associated with the processing of the ticket, wherein a single thread of execution at the server-computational node processes the at least two tickets, and the respective remote procedure call requests through completion.

37. The physical computer readable medium according to claim 36, wherein the function is a submit function to initiate processing the ticket.

38. The physical computer readable medium according to claim 36, wherein the function is a completion function to receive a result of processing of the ticket.

39. The physical computer readable medium according to claim 36, wherein the information includes a status of processing of the ticket.

40. The physical computer readable medium according to claim 36, wherein the processing of the ticket is performed asynchronously using the single thread of execution.

41. A computer program product for use with a computer, the computer program product comprising a physical computer usable medium having a computer readable program code embodied therein for managing at least two remote procedure call requests in a distributed computing system, the computer readable program code embodied on the physical computer usable medium of the computer program product comprising instructions that when executed by a processor cause the processor to:

a. receive each of the at least two remote procedure call requests at a server-computational node; and b. serve each of the at least two remote procedure call requests through completion using a single thread of execution at the server-computational node, wherein the single thread of execution serves the at least two remote procedure call requests through processing with the single thread of execution one or more tickets instantiated for each of the at least two remote procedure call requests, and each ticket is a data structure representing a logical event-driven activity associated with the respective remote procedure call request.

* * * * *